(12) United States Patent
Sridharan et al.

(10) Patent No.: US 11,062,300 B1
(45) Date of Patent: Jul. 13, 2021

(54) SYSTEM AND METHOD FOR USING A BOARDING PASS TO FACILITATE FINANCIAL TRANSACTIONS

(71) Applicant: Wells Fargo Bank, N.A., San Francisco, CA (US)

(72) Inventors: Srivathsan Sridharan, Bangalore (IN); Akash Gupta, Bangalore (IN); Tarun Kailaschandbaid, Bangalore (IN); Ramanathan Ramanathan, Bellevue, WA (US); Shanmukeswara Donkada, Hyderabad (IN)

(73) Assignee: WELLS FARGO BANK, N.A., San Francisco, CA (US)

(*) Notice: Subject to any disclaimer, the term of this patent is extended or adjusted under 35 U.S.C. 154(b) by 830 days.

(21) Appl. No.: 15/388,033

(22) Filed: Dec. 22, 2016

(51) Int. Cl.
*G06Q 20/40* (2012.01)
*G06Q 20/20* (2012.01)
*G06Q 10/02* (2012.01)
*G06Q 20/36* (2012.01)

(52) U.S. Cl.
CPC ........... *G06Q 20/36* (2013.01); *G06Q 10/025* (2013.01); *G06Q 20/20* (2013.01); *G06Q 20/405* (2013.01)

(58) Field of Classification Search
USPC .............................. 705/16, 66; 235/380, 384
See application file for complete search history.

(56) References Cited

U.S. PATENT DOCUMENTS

| | | | |
|---|---|---|---|
| 6,910,628 B1* | 6/2005 | Sehr | G07C 9/25 235/384 |
| 7,085,726 B1* | 8/2006 | Galperin | G06Q 10/02 705/5 |
| 2008/0041935 A1* | 2/2008 | Fawcett | G06Q 20/24 235/380 |
| 2011/0208601 A1* | 8/2011 | Ferguson | G06Q 20/4016 705/16 |
| 2015/0319161 A1* | 11/2015 | Dimmick | H04W 4/025 726/4 |
| 2016/0162871 A1* | 6/2016 | Lee | G06Q 10/02 705/66 |
| 2018/0174252 A1* | 6/2018 | Senci | H04L 63/107 |

* cited by examiner

*Primary Examiner* — Peter Ludwig
*Assistant Examiner* — Reva R Moore
(74) *Attorney, Agent, or Firm* — Walter Haverfield LLP; James J. Pingor (57) ABSTRACT

Systems and methods provide for using a boarding pass as a financial instrument to make payments and other financial transactions. A passenger name record, a standardized computer reservation system protocol, can be associated with one or more financial accounts. When a point of sale device scans the boarding pass, either on a mobile device, or a traditional paper boarding pass, the passenger name record can be used to find a travel itinerary associated with the customer. By matching the travel itinerary to location of the point of sale device, and the time, payments can be authorized, and then initiated using financial account information associated with the passenger name record.

17 Claims, 10 Drawing Sheets

SYSTEM AND METHOD FOR USING A BOARDING PASS TO FACILITATE FINANCIAL TRANSACTIONS

BACKGROUND

Virtual credit cards and mobile wallets are popular mechanisms to allow people to make purchases and financial transactions without having to handle credit cards, debit cards, and cash to avoid the risk of fraud and theft. Fraud and theft may be even more likely while traveling as customers are in new and unfamiliar situations, sleep deprived, and distracted.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The disclosure disclosed and claimed herein, in one aspect thereof, includes systems and methods that facilitate using a boarding pass as a financial instrument to make payments and other financial transactions. A passenger name record, a standardized computer reservation system protocol, can be associated with one or more financial accounts. When a point of sale device scans the boarding pass, either on a mobile or most any IOT device (such as smart watch etc.), or a traditional paper boarding pass, the passenger name record can be used to find a travel itinerary associated with the customer. As used herein, these terms are used interchangeably. By matching the travel itinerary to location of the point of sale device, and the time, payments can be authorized, and then initiated using financial account information associated with the passenger name record.

For these considerations, as well as other considerations, in one or more embodiments, a system for making payments with a boarding pass can include a memory to store computer-executable instructions and a processor, coupled to the memory, to facilitate execution of the computer-executable instructions to perform operations. The operations can include receiving a passenger name record number and a payment request from a point of sale device, wherein the passenger name record number is determined in response to the point of sale device scanning the boarding pass. The operations can also include identifying a travel itinerary based on the passenger name record number and a first location of the point of sale device and a first time the boarding pass was scanned. The operations can also include authenticating the payment request in response to the first time and the first location of the point of sale device matching a second time and a second location on the travel itinerary.

In another embodiment, a method for making payments using a passenger name record number can comprise receiving, by a device comprising a processor, the passenger name record number from a point of sale device, a payment request, and information identifying a location of the point of sale device and a time of the payment request. The method can also include determining, by the device, a travel itinerary associated with the passenger name record number, wherein the travel itinerary identifies a set of locations with respective time ranges. The method can also include authorizing, by the device, the payment request in response to the location of the point of sale device and the time of the payment request matching a location of the travel itinerary with a respective time range.

In another embodiment, a non-transitory computer-readable medium, comprising instructions that when executed by a computer processor perform operations. The operations can include receiving the passenger name record number from a point of sale device, a payment request, and information identifying a location of the point of sale device and a time of the payment request. The operations can also include determining a travel itinerary associated with the passenger name record number, wherein the travel itinerary identifies a set of locations with respective time ranges. The operations can also include authorizing the payment request in response to the location of the point of sale device and the time of the payment request matching a location of the travel itinerary with a respective time range. The operations can also include initiating payment from a financial account associated with the passenger name record in response to authorizing the payment request.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The following terms are used throughout the description, the definitions of which are provided herein to assist in understanding various aspects of the disclosure.

As used in this disclosure, the term "device" or "client device" refers to devices, items or elements that may exist in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In one or more embodiments a system and method for using a boarding pass to facilitate make payments and other financial transactions is provided. A passenger name record, a standardized computer reservation system protocol, can be associated with one or more financial accounts. When a point of sale device scans the boarding pass, either on a mobile device or a traditional paper boarding pass, the passenger name record can be used to find a travel itinerary associated with the customer. By matching the travel itinerary to location of the point of sale device, and the time, payments can be authorized, and then initiated using financial account information associated with the passenger name record.

Matching the itinerary and the time and location of the payment can provide a partial level of assurance that the person is who they claim to be, since they are known to be at that location (airport, train station, etc) during that time period. If a person traveling from Location A to Location C, with a layover at Location B, tries to make a payment at Location A when the itinerary says that the person is currently scheduled to be at Location B, the payment can be prevented since the time and location do not match the itinerary. The system can get updated itinerary information from flight/itinerary trackers that track the takeoffs and landings and other statuses of flights/itineraries.

In an embodiment, a plurality of financial accounts can be associated with the passenger name record. When making a payment using the boarding pass, the user can indicate which financial account they want to use for making the payment. In other embodiments, the financial account may get selected automatically from a set of financial accounts depending on the circumstances. For instance, travel services (lounges, upgrades, tickets, etc) may get charged to a predetermined financial account, whereas incidentals, kiosks, restaurants, etc, may get charged to different financial accounts. In other embodiments, depending on the authorized code the customer enters into the point of sale (POS) device, or the mobile device, different financial accounts can be selected. As is to be understood, in aspects, the selection of accounts could be based on pre-configured type(s) of transaction(s). For example, the POS can be identified into a specific category, e.g., restaurants in a recreation category, as per a defined configuration that can be employed automatically. Other aspects can prompt a user to select.

In yet another embodiment, various people can be associated with a single passenger name record (e.g., when tickets for multiple people are bought together). Each of the passengers can have respective authorized codes and financial accounts associated with the passengers, and those financial accounts can be selected when the respective passengers make purchases.

In an embodiment, biometric information received from a mobile device or POS device can be used to authenticate a person making a purchase using the boarding pass. For instance, biometric information (fingerprint scanner, etc) can be preassociated with the passenger name record. When a POS device scans the boarding pass, the payment server can send a request for authentication to the POS or a mobile device associated with the passenger name record. The user can scan the fingerprint, or otherwise enter their biometric data, and the data can be sent back to the server to authenticate the user.

Figure 1:
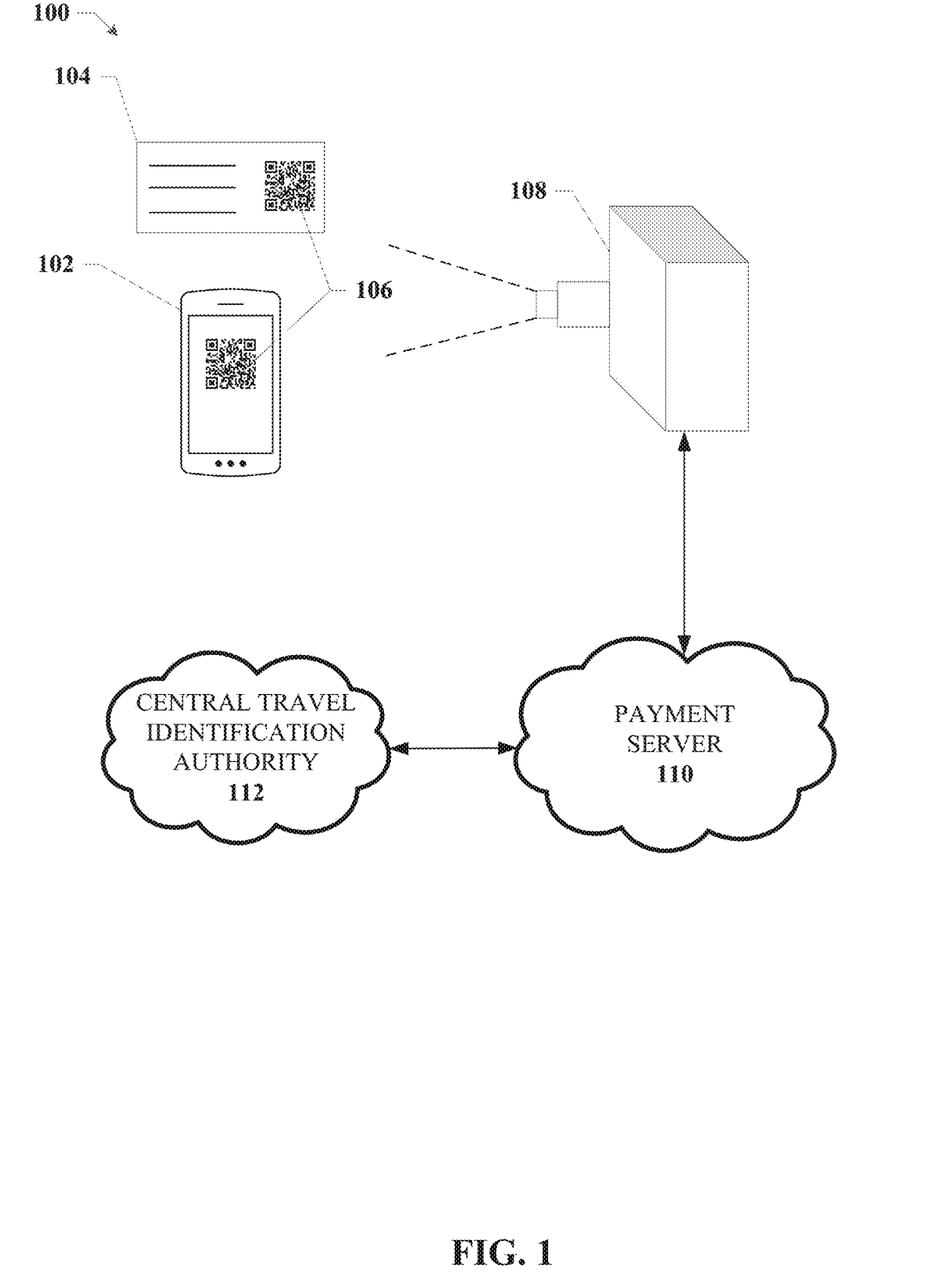
FIG. 1 is an illustration of an example system for making payments using a boarding pass in accordance with one or more aspects of the disclosure.

Turning now to FIG. 1, illustrated is an example system 100 for making payments using a boarding pass in accordance with one or more aspects of the disclosure.

In an embodiment, a customer can use a boarding pass to make payments while traveling. Boarding passes can be linked to a passenger name record (PNR) that is a record in a database of a computer reservation system that contains the itinerary of a passenger, or a group of passengers travelling together. When a passenger books an itinerary, the travel agent, or travel website, or airline will create a PNR in the computer reservation system that it uses. This can be one of several large global distribution systems that enable automated transactions between travel service providers (mainly airlines, hotels and car rental companies) and travel agencies. Since the PNR is a static number across a passenger's travel itinerary, the same PNR can be linked to one or more financial accounts, thus forming a virtual wallet that can be used to facilitate financial transactions.

A POS device 108 at a commercial/service location (e.g., airline service, airport kiosk, restaurant, train station, airport lounge, duty free shopping center, and etc.) can scan a barcode 106 on either a paper boarding pass 104 or an electronic boarding pass on a mobile device 102. The barcode 106 can in an embodiment, be the same barcode that is scanned when boarding a flight or bus. The scanned barcode information can be passed to a payment server 110 that uses the PNR number to identify the itinerary with a central travel identification authority (CTIA) 112 (e.g., a global distribution system). The payment request that the POS device 108 sends to the payment server 110 can also include a time stamp indicating the time of the scan, as well as information identifying the location of the POS device 108. The time of the payment request and the location can be compared to the travel itinerary as retrieved from the CTIA 112, and if there is a match, the payment can be authorized.

In an embodiment, the barcode 106 on the boarding pass, paper or digital can be a optical, machine readable representation of data comprising the PNR number and other information identifying the passenger and travel itinerary. The bar cade can be a linear barcode, or matrix (2D) barcode such as a Quick Response (QR) code. In some embodiments, the mobile device 102 can transmit the PNR number and other information to the POS device 108 wirelessly using Bluetooth, Near Field Communications (NFC), or IR). The data can be transmitted to the POS device 108 in response to a prompt or query from the POS device 108, or by the customer when attempting to initiate a financial transaction.

In an embodiment, matching the location and time comprises determining if the payment time and location matches the itinerary of the passenger. If the passenger is scheduled to be in a location during a time range, if the payment time and location match both the itinerary time and location, then the payment is approved. If either or both the location or time do not match, the payment requested is rejected. This can provide a level of fraud protection by making sure that payments are not made when the traveler is not present at a location.

In an example if a person traveling from Location A to Location C, with a layover at Location B, tries to make a payment at Location A when the itinerary says that the person is currently scheduled to be at Location B, the payment can be rejected since the time and location do not match the itinerary. The system can get updated itinerary information from flight/itinerary trackers that track the take-offs and landings and other statuses of flights/itineraries.

In an embodiment, the payment server 110 can approve payment requests that are made within predetermined time ranges from the itinerary or travel schedule. For instance, payments at a departure location can be approved if they are made within two hours (or any other predetermined time period) of the first flight or departure. Likewise, payments can be approved at the destination for up to two hours (or any other predetermined time period) after arrival. In an embodiment, the predetermined time periods can be set by the payment server 110 or can be configured by the passenger.

In an embodiment, the PNR number can be associated with a plurality of financial accounts. The financial accounts can include credit card accounts, checking accounts, savings accounts, debit card accounts, prepaid accounts, gift cards, and other methods of payment that can be used to facilitate financial transactions. The customer, when buying tickets for the trip, generating the itinerary and/or when getting assigned a PNR number, can associate one or more of these financial accounts with the PNR number. In an embodiment, the financial account used to purchase the ticket(s) can automatically be associated with the PNR number. In other embodiments, the passenger can be prompted to add one or more financial accounts.

In an embodiment, the passenger can select which account to be used to complete the financial transaction with the POS device 108 and payment server 110. In an embodiment, a predetermined account can be selected for one or more legs of the itinerary. For instance, a credit card account can be used for the duration of the itinerary, whereas in other embodiments, a credit card account can be used for predetermined portions of the itinerary, and another credit card account or bank account can be used for the other portions of the itinerary. In an embodiment, predetermined accounts can be selected based on the destination, layover and/or arrival locations. In other embodiments, predetermined accounts can be used based on the time of transaction or date of transaction.

In some embodiments, the type of authentication information received via the POS device 108 or the mobile device 102 can be used to select the account. To authenticate or authorize the transaction, one or more PIN numbers or passwords can be used, and each PIN or password can be associated with respective financial accounts. In other embodiments, the passenger can select which financial account to use based on a user interface selection via either the mobile device 102 or the POS device 108.

In an embodiment, the financial account selected can be based on the type of financial transaction requested. For instance, travel services (lounges, upgrades, tickets, etc) may get charged to a predetermined financial account, whereas incidentals, kiosks, restaurants, etc, may get charged to different financial accounts.

In an embodiment, there can be multiple people travelling together, each sharing a PNR number. The financial account selected can be based on the person making the transaction. Different authorization codes or biometric information can therefore select predetermined accounts when making financial transactions.

Figure 2:
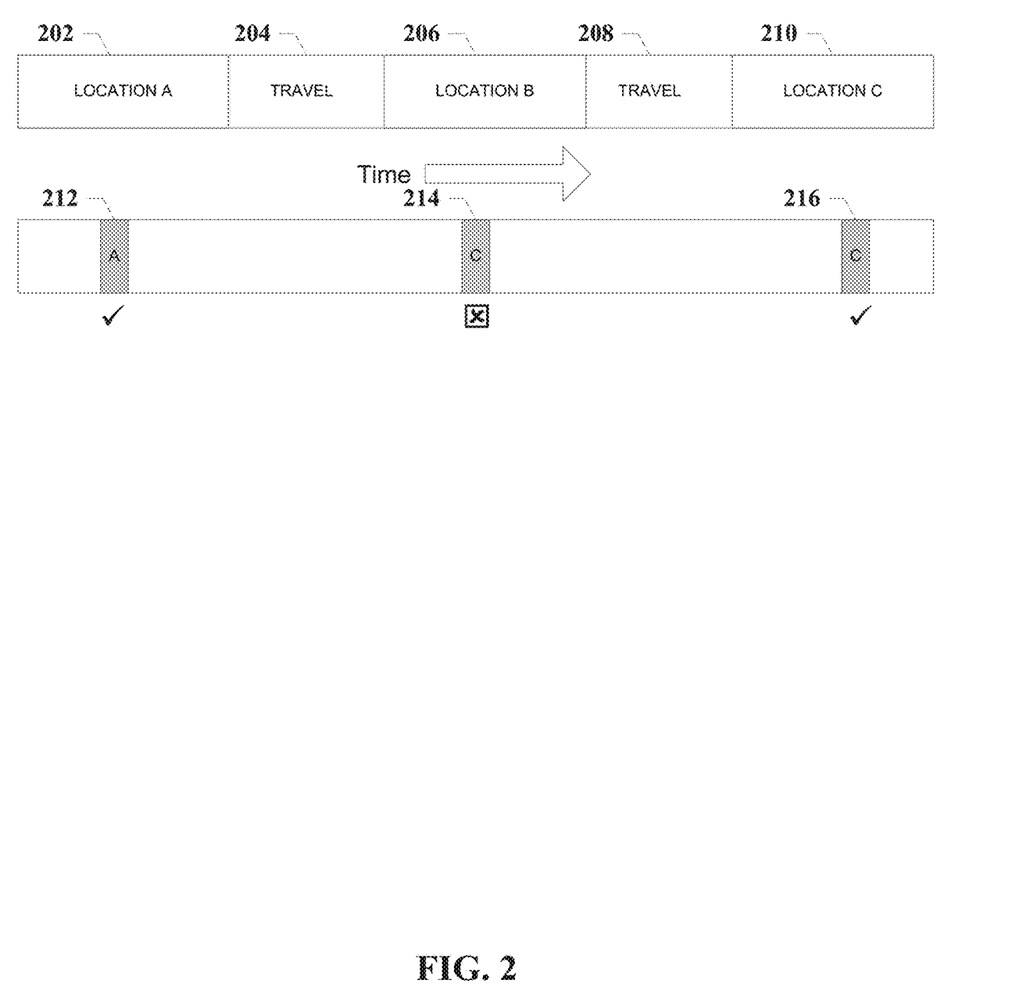
FIG. 2 is an illustration of an example system that compares a location and time of a payment request to a travel itinerary in accordance with one or more aspects of the disclosure.

Turning now to FIG. 2, illustrated is an example system 200 that compares a location and time of a payment request to a travel itinerary in accordance with one or more aspects of the disclosure. In an embodiment, the payment server 110 can match the time of the payment request and location of the payment request, as received from either the POS device 108 or the mobile device 102 to a travel itinerary associated with the PNR number. The matching the location and time comprises determining if the payment time and location matches the itinerary of the passenger. If the passenger is scheduled to be in a location during a time range, if the payment time and location match both the itinerary time and location, then the payment is approved. If either or both the location or time do not match, the payment requested is rejected. This can provide a level of fraud protection by making sure that payments are not made when the traveler is not present at a location.

In an example if a person traveling from Location A to Location C, with a layover at Location B, tries to make a payment at Location A when the itinerary says that the person is currently scheduled to be at Location B, the payment can be rejected since the time and location do not match the itinerary. The system can get updated itinerary information from flight/itinerary trackers that track the take-offs and landings and other statuses of flights/itineraries.

In the embodiment shown in FIG. 2, the travel itinerary which is shown on the top bar includes a passenger who is at a location A at 202, then spends time travelling at 204 to a layover location B at 206, and then spends time traveling again at 208 to a destination at location C at 210. During the trip, a number of transactions are initiated using the passenger name record at 212, 214, and 216 in the lower bar showing a transaction timeline. At transaction 212, which is performed at a POS device at location A, the travel itinerary shows that the passenger is indeed at location A at 202, and so the payment request can be authorized.

At transaction 214, which is performed at a POS device at location C, the passenger, according to the travel itinerary, is not yet at location C, in fact the passenger is at location B at 206. Accordingly, the payment request can be rejected. At 216 however, the payment, which is made at a POS device at location C, matches the location of the passenger according to the itinerary however, and so the payment can be approved.

Figure 3:
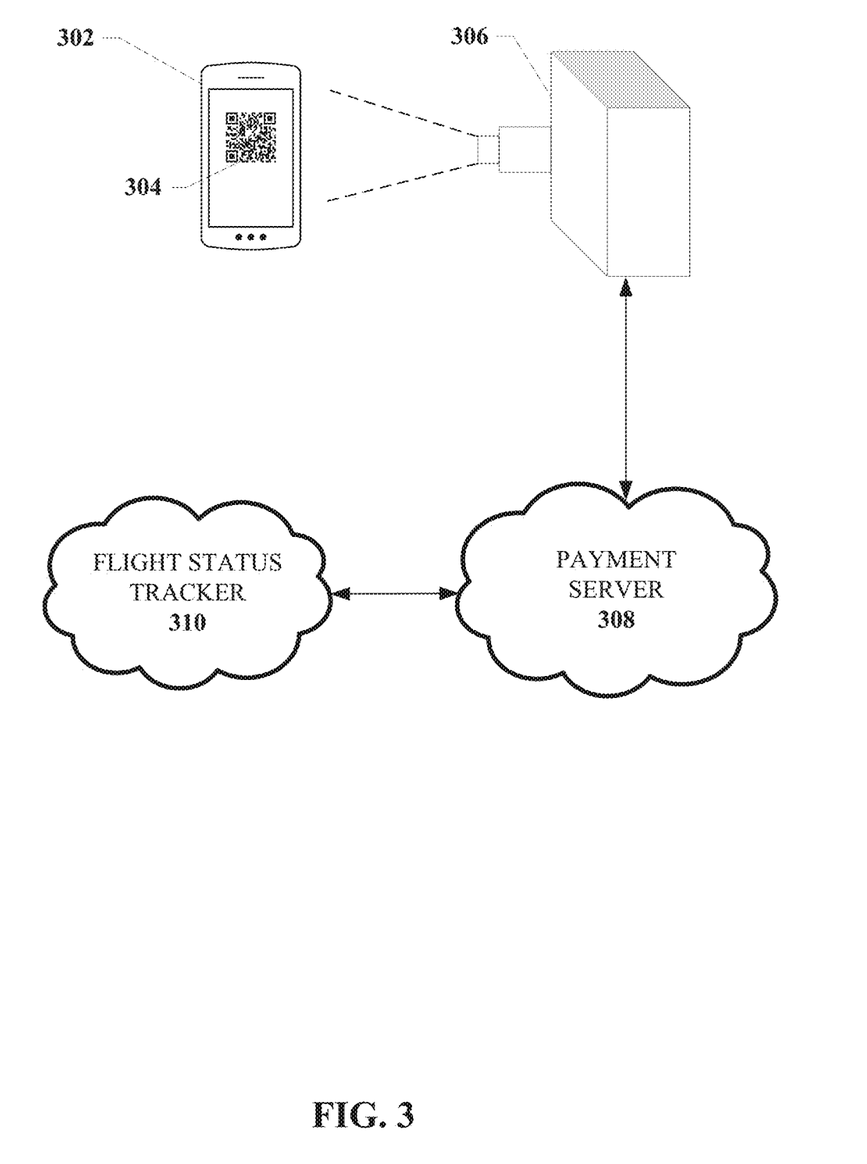
FIG. 3 is an illustration of an example system that can use updated travel itinerary statuses from a flight status tracker in accordance with one or more aspects of the disclosure.

Turning now to FIG. 3 illustrated is an example system 300 that can use updated travel itinerary statuses from a flight status tracker in accordance with one or more aspects of the disclosure.

A POS device 306 at a commercial/service location (e.g., airline service, airport kiosk, restaurant, train station, airport lounge, duty free shopping center, and etc.) can scan a barcode 304 on a mobile device 302. The barcode 304 can in an embodiment, be the same barcode that is scanned when boarding a flight or bus. The scanned barcode information can be passed to a payment server 308 that uses the PNR number to identify the itinerary with a central travel identification authority (CTIA) (e.g., a global distribution system). The payment request that the POS device 306 sends to the payment server 308 can also include a time stamp indicating the time of the scan, as well as information identifying the location of the POS device 306. The time of the payment request and the location can be compared to the travel itinerary as retrieved from the CTIA, and if there is a match, the payment can be authorized.

In an embodiment, matching the location and time comprises determining if the payment time and location matches the itinerary of the passenger. If the passenger is scheduled to be in a location during a time range, if the payment time and location match both the itinerary time and location, then the payment is approved. If either or both the location or time do not match, the payment requested is rejected. This can provide a level of fraud protection by making sure that payments are not made when the traveler is not present at a location.

The itinerary can get updated by a flight status tracker 310 that can provide updated itinerary information from the CTIA, and can also provide realtime or near to realtime flight and other travel status information to the payment server 308. For instance, if a flight or bus is delayed, the flight status tracker 310 can provide the delay information to payment server 308 and can provide estimated or actual departure times and projected arrival times.

In an embodiment, the flight status tracker 310 can provide regular or periodic updates to the payment server 308, or can provide updates whenever a flight is delayed. In other embodiments, the payment server 308 can send a request for an update to flight status tracker 310 whenever a payment request from the POS device 306 is being processed.

Figure 4:
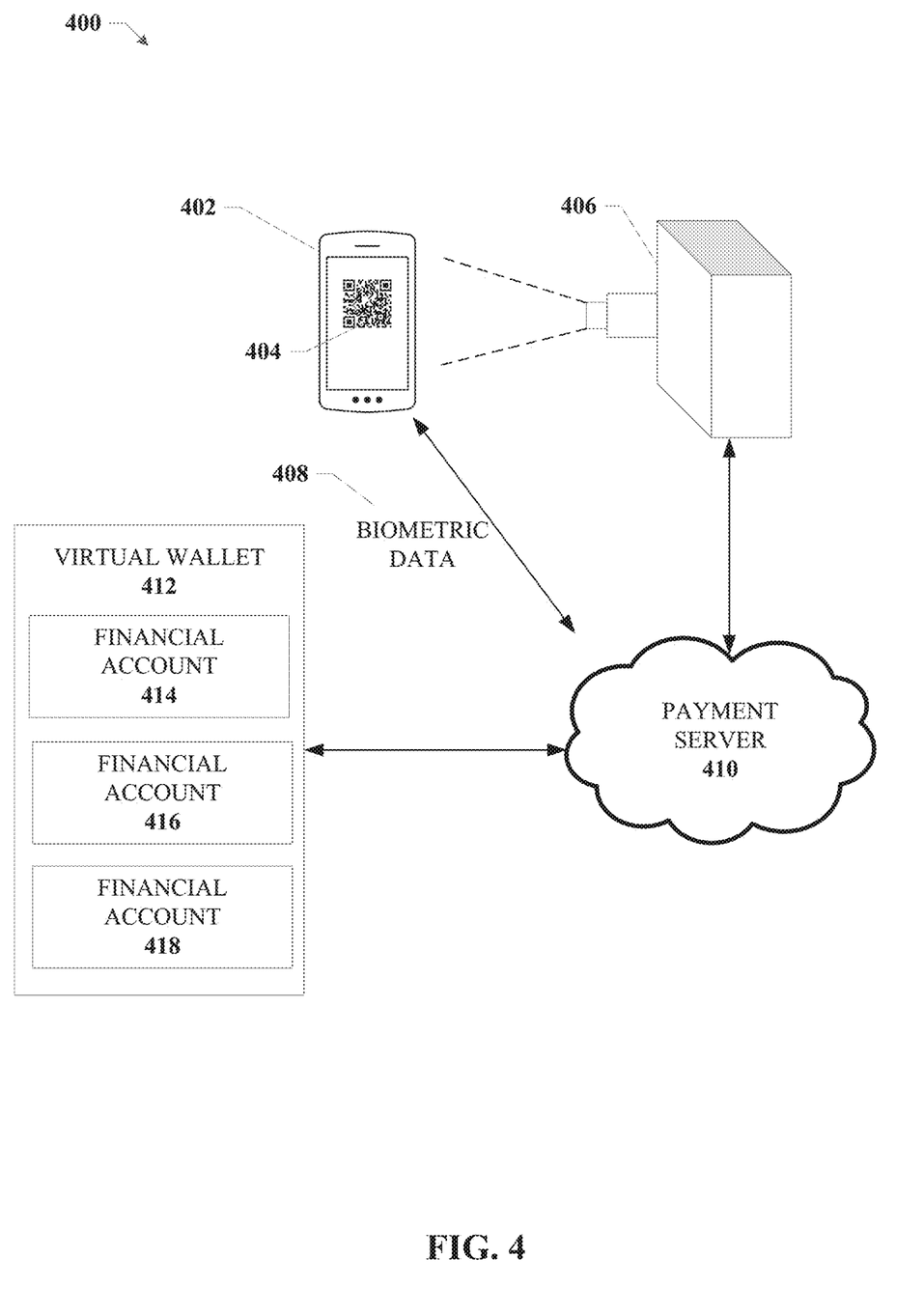
FIG. 4 is an illustration of an example system for making payments from one or more financial accounts using a boarding pass in accordance with one or more aspects of the disclosure.

Turning now to FIG. 4, illustrated is an example system 400 for making payments from one or more financial accounts using a boarding pass in accordance with one or more aspects of the disclosure.

A POS device 406 at a commercial/service location (e.g., airline service, airport kiosk, restaurant, train station, airport lounge, duty free shopping center, and etc.) can scan a barcode 404 on a mobile device 402. The barcode 404 can in an embodiment, be the same barcode that is scanned when boarding a flight or bus. The scanned barcode information can be passed to a payment server 410 that uses the PNR number to identify the itinerary with a central travel identification authority (CTIA) (e.g., a global distribution system). The payment request that the POS device 406 sends to the payment server 410 can also include a time stamp indicating the time of the scan, as well as information identifying the location of the POS device 406. In some embodiments, the POS device 406 can also receive biometric data 408 from the mobile device 402 and pass it to the payment server 410. In other embodiments, the mobile device 402 can transmit the biometric data 408 to the payment server 410 directly, or not via the POS device 406. The time of the payment request and the location can be compared to the travel itinerary as retrieved from the CTIA, and if there is a match, the payment can be authorized.

In an embodiment, there can be a plurality of financial accounts 414, 416, and 418 associated with a virtual wallet 412 associated with the PNR number. The payment server 410 can select which of the financial accounts to complete the transaction in a number of different ways. In an embodiment, the biometric data 408 can be associated with respective financial accounts, and the payment server 410 can select the matching financial account based on the biometric data 408. In other embodiments, other authentication information, PIN numbers, passwords, etc, can be used to select one or more of financial accounts 414, 416, and/or 418.

In yet another embodiment, the passenger can select which account 414, 416, or 418 to be used to complete the financial transaction with the POS device 406 and payment server 410. In an embodiment, a predetermined account can be selected for one or more legs of the itinerary. For instance, financial account 414 can be used for the duration of the itinerary, whereas in other embodiments, financial account 416 can be used for predetermined portions of the itinerary, and financial account 418 can be used for the other portions of the itinerary. In an embodiment, predetermined accounts can be selected based on the destination, layover and/or arrival locations. In other embodiments, predetermined accounts can be used based on the time of transaction or date of transaction.

In other embodiments, the passenger can select which financial account to use based on a user interface selection via either the mobile device 402 or the POS device 406.

In an embodiment, the financial account selected can be based on the type of financial transaction requested. For instance, travel services (lounges, upgrades, tickets, etc) may get charged to a predetermined financial account, whereas incidentals, kiosks, restaurants, etc, may get charged to different financial accounts.

In an embodiment, there can be multiple people travelling together, each sharing a PNR number. The financial account selected can be based on the person making the transaction.

Different authorization codes or biometric information can therefore select predetermined accounts when making financial transactions.

Figure 5:
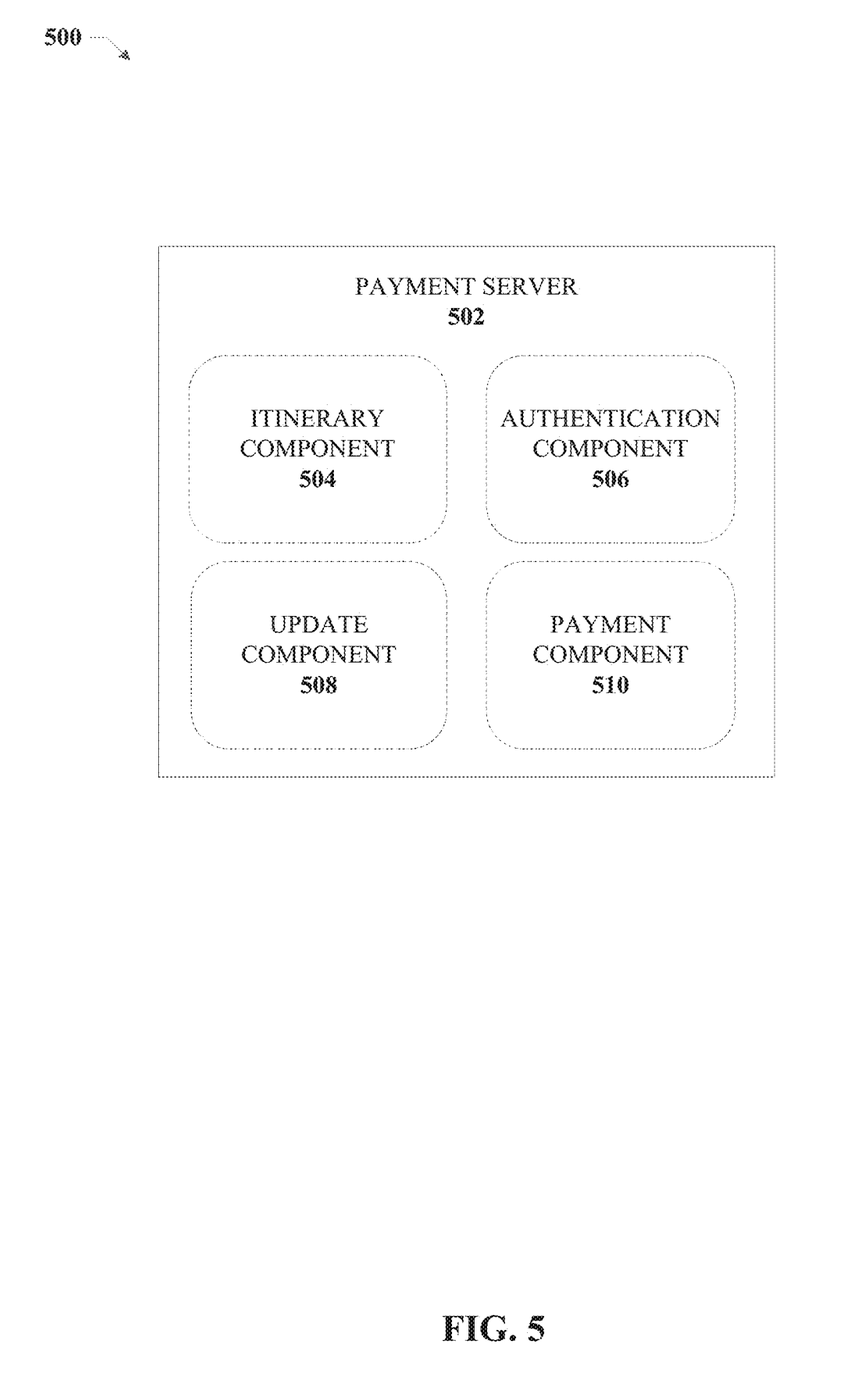
FIG. 5 is an illustration of an example payment server system in accordance with one or more aspects of the disclosure.

Turning now to FIG. 5, illustrated is an example payment server system 500 in accordance with one or more aspects of the disclosure.

A payment server 502 can include an itinerary component 504 that receives a passenger name record number and a payment request from a point of sale device wherein the passenger name record number is determined in response to the point of sale device scanning the boarding pass. The PNR number can be optically scanned by the POS device, which can scan a paper boarding pass or an electronic boarding pass on a mobile device.

The itinerary component 504 can also retrieve a travel itinerary based on the passenger name record number and a first location of the point of sale device and a first time the boarding pass was scanned. The itinerary component 504 can retrieve the itinerary from a central travel identification authority (CTIA) (e.g., a global distribution system). If the time and location from the POS device match the travel itinerary, the authentication component 506 can approve the payment. In an embodiment, matching the location and time comprises determining if the payment time and location matches the itinerary of the passenger. If the passenger is scheduled to be in a location during a time range, if the payment time and location match both the itinerary time and location, then the payment is approved. If either or both the location or time do not match, the payment requested is rejected. This can provide a level of fraud protection by making sure that payments are not made when the traveler is not present at a location.

In an example if a person traveling from Location A to Location C, with a layover at Location B, tries to make a payment at Location A when the itinerary says that the person is currently scheduled to be at Location B, the payment can be rejected since the time and location do not match the itinerary. The system can get updated itinerary information from flight/itinerary trackers that track the take-offs and landings and other statuses of flights/itineraries.

The authentication component 506 can also authenticate the transaction based on one or more PIN numbers or passwords or biometric data received from the POS device or a mobile device associated with the passenger. The PIN numbers, passwords, and biometric data can be preassociated with the PNR or the financial accounts. The biometric data can comprise fingerprint information as scanned by the POS device or the passenger's mobile device, and can also include facial recognition information in an embodiment.

In an embodiment, the payment component 510 can select which financial account associated with the virtual wallet to complete the transaction with. The financial accounts can include credit card accounts, checking accounts, savings accounts, debit card accounts, prepaid accounts, gift cards, and other methods of payment that can be used to facilitate financial transactions. The customer, when buying tickets for the trip, generating the itinerary and/or when getting assigned a PNR number, can associate one or more of these financial accounts with the PNR number. In an embodiment, the financial account used to purchase the ticket(s) can automatically be associated with the PNR number. In other embodiments, the passenger can be prompted to add one or more financial accounts.

In an embodiment, the passenger can select which account to be used to complete the financial transaction with the POS device and payment server 502. In an embodiment, a predetermined account can be selected for one or more legs of the itinerary. For instance, a credit card account can be used for the duration of the itinerary, whereas in other embodiments, a credit card account can be used for predetermined portions of the itinerary, and another credit card account or bank account can be used for the other portions of the itinerary. In an embodiment, predetermined accounts can be selected based on the destination, layover and/or arrival locations. In other embodiments, predetermined accounts can be used based on the time of transaction or date of transaction.

In some embodiments, the type of authentication information received via the POS device or the mobile device can be used to select the account. To authenticate or authorize the transaction, one or more PIN numbers or passwords can be used, and each PIN or password can be associated with respective financial accounts. In other embodiments, the passenger can select which financial account to use based on a user interface selection via either the mobile device or the POS device.

In an embodiment, the financial account selected by the payment component 510 can be based on the type of financial transaction requested. For instance, travel services (lounges, upgrades, tickets, etc) may get charged to a predetermined financial account, whereas incidentals, kiosks, restaurants, etc, may get charged to different financial accounts.

Update component 508 can be configured to update the travel itinerary based on information received from a flight tracker server. For instance, if a flight or bus is delayed, the flight status tracker can provide the delay information to update component 508 and can provide estimated or actual departure times and projected arrival times.

In an embodiment, the flight status tracker can provide regular or periodic updates to the update component 508, or can provide updates whenever a flight is delayed. In other embodiments, the update component 508 can send a request for an update to flight status tracker whenever a payment request from the POS device is being processed by the payment server 502.

Figure 6:
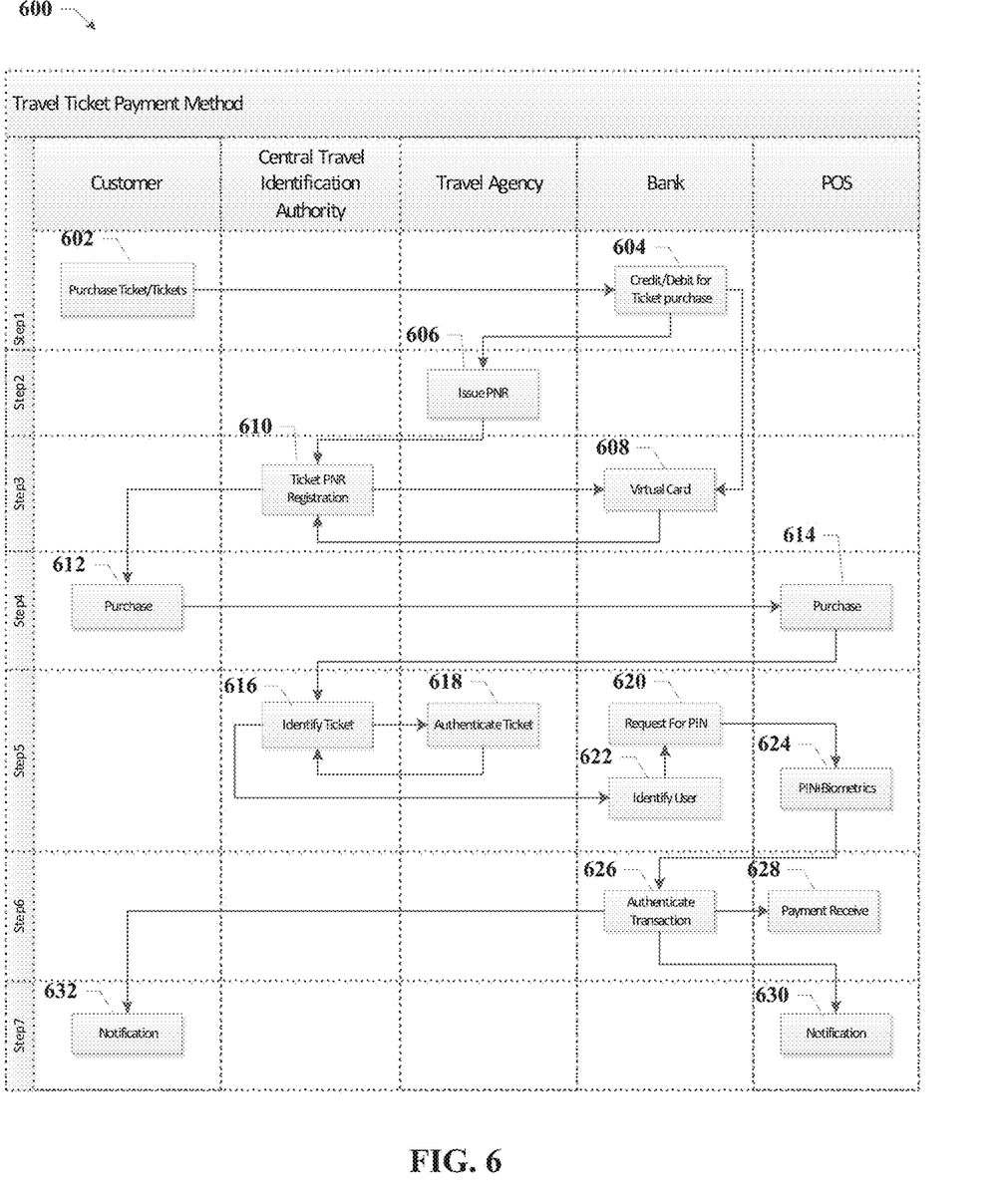
FIG. 6 is an illustration of an example flow chart for making payments using a boarding pass according to one or more embodiments.

Turning now to FIG. 6, illustrated is an example flow chart 600 for making payments using a boarding pass according to one or more embodiments at 602 a customer can purchase a ticket and a bank can authorize the ticket purchase at 604. At 606 the travel agency issues a PNR number and it is registered with a CTIA at 610. At 608, a virtual card can be registered, either based on the bank account used to purchase the ticket, or in response to registering the PNR number at the CTIA. At 612, the purchase of the ticket is completed, and the virtual account associated with the PNR is established.

At 614, when the passenger tries to purchase an item via a POS device, the POS device can send the PNR number to a CTIA which identifies the ticket at 616, and then has the ticket authenticated at 618. The user can then be identified by the bank based on the PNR number at 622 and a PIN number can be requested at 620 to authenticate the user. The POS device can request the pin and/or biometrics at 624, and then the bank can authenticate the transaction at 626 with the pin number and/or biometrics received from the passenger. The POS device 628 can then facilitate the transaction at 620, and the passenger and the POS device can receive notifications at 632 and 630 respectively.

It is to be recognized that the above method is merely an exemplary method for some of the embodiments disclosed herein and does not preclude other embodiments as described herein.

Figure 7:
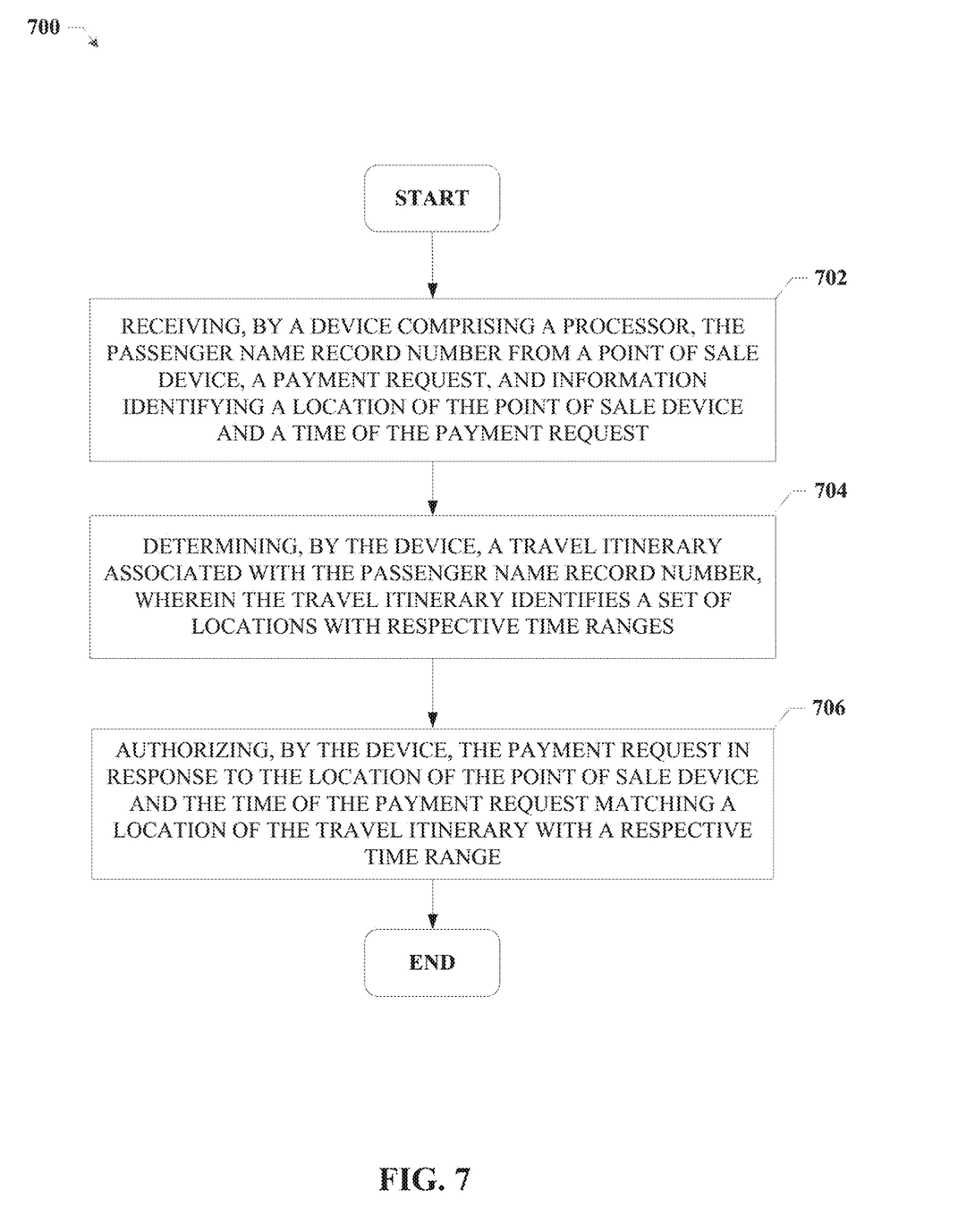
FIG. 7 is an illustration of an example flow chart of a method for making payments using a boarding pass according to one or more embodiments.
Figure 8:
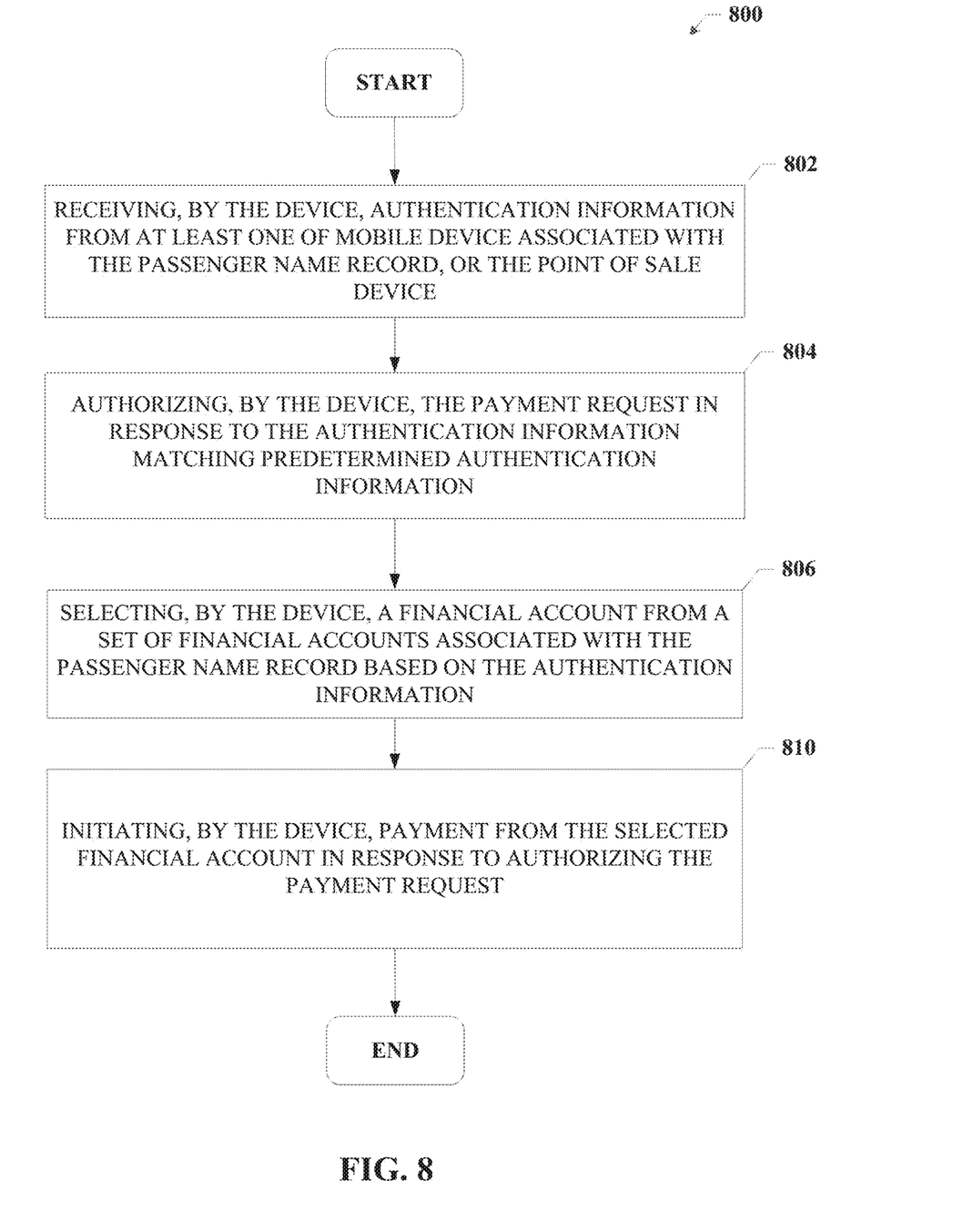
FIG. 8 is an illustration of an example flow chart of a method for making payments using a boarding pass according to one or more embodiments.

FIGS. 7-8 illustrates processes in connection with the aforementioned systems. The process in FIGS. 7-8 can be implemented for example by systems 100, 200, 210, 300, 400, and 500, illustrated in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 7, illustrated is an example flow chart 700 of a method for making payments using a boarding pass according to one or more embodiments.

The method can start at 702, where the method includes receiving, by a device comprising a processor, the passenger name record number from a point of sale device, a payment request, and information identifying a location of the point of sale device and a time of the payment request.

The method can continue at 704, where the method includes determining, by the device, a travel itinerary associated with the passenger name record number, wherein the travel itinerary identifies a set of locations with respective time ranges.

The method can continue at 706 where the method includes authorizing, by the device, the payment request in response to the location of the point of sale device and the time of the payment request matching a location of the travel itinerary with a respective time range.

Turning now to FIG. 8, illustrated is an example flow chart 800 of a method for making payments using a boarding pass according to one or more embodiments.

Method 800 can start at 802 where the method includes receiving, by the device, authentication information from at least one of mobile device associated with the passenger name record, or the point of sale device.

The method can continue at 804 where the method includes authorizing, by the device, the payment request in response to the authentication information matching predetermined authentication information.

The method can continue at 806, where the method includes selecting, by the device, a financial account from a set of financial accounts associated with the passenger name record based on the authentication information. The method can continue at 808 where the method includes initiating, by the device, payment from the selected financial account in response to authorizing the payment request.

Figure 9:
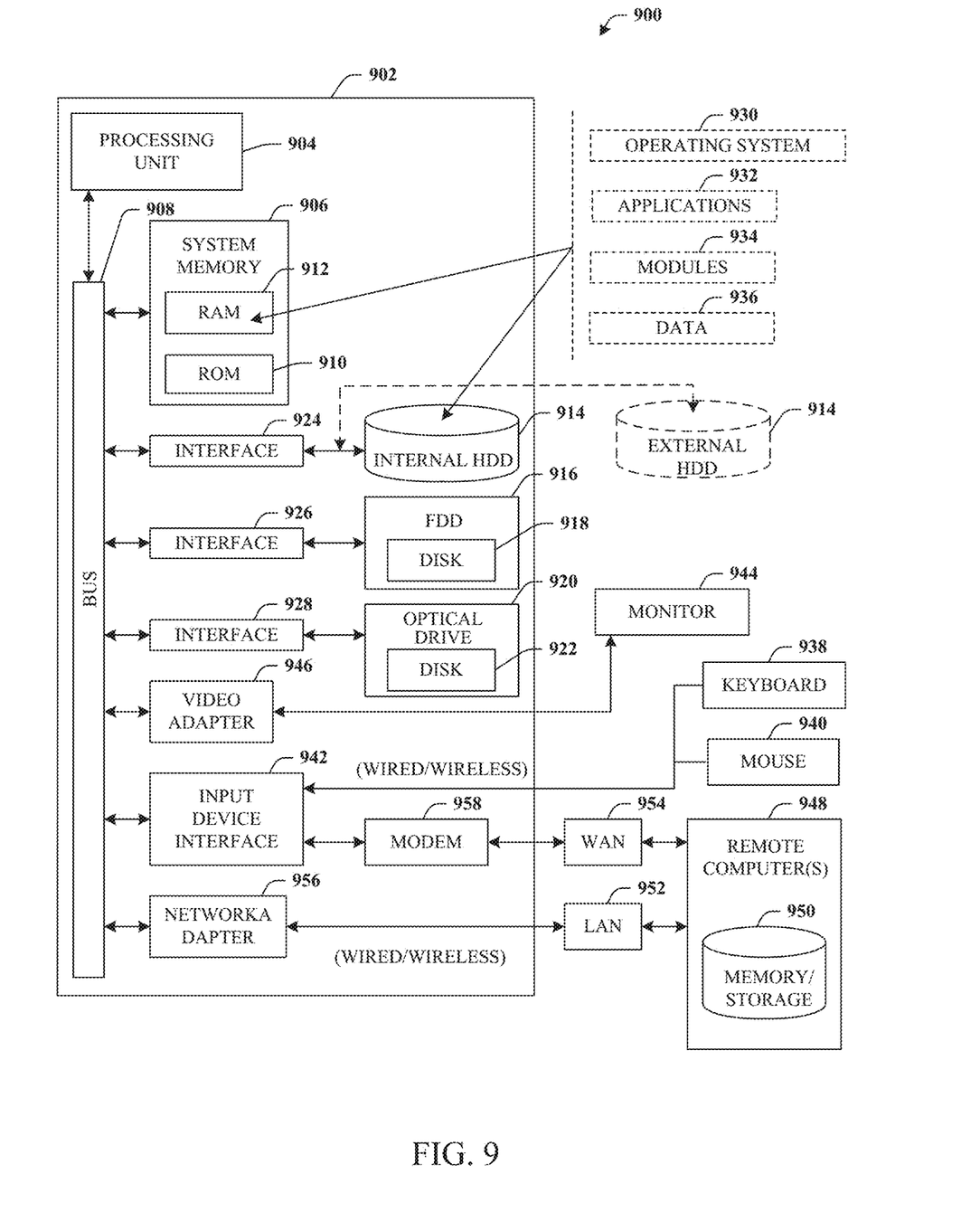
FIG. 9 is an illustration of an example computing environment where one or more of the provisions set forth herein are implemented, according to one or more embodiments.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. The innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules or components depicted relative to the computer 902, or portions thereof, can be stored in the remote memory/storage device 950. The network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 10:
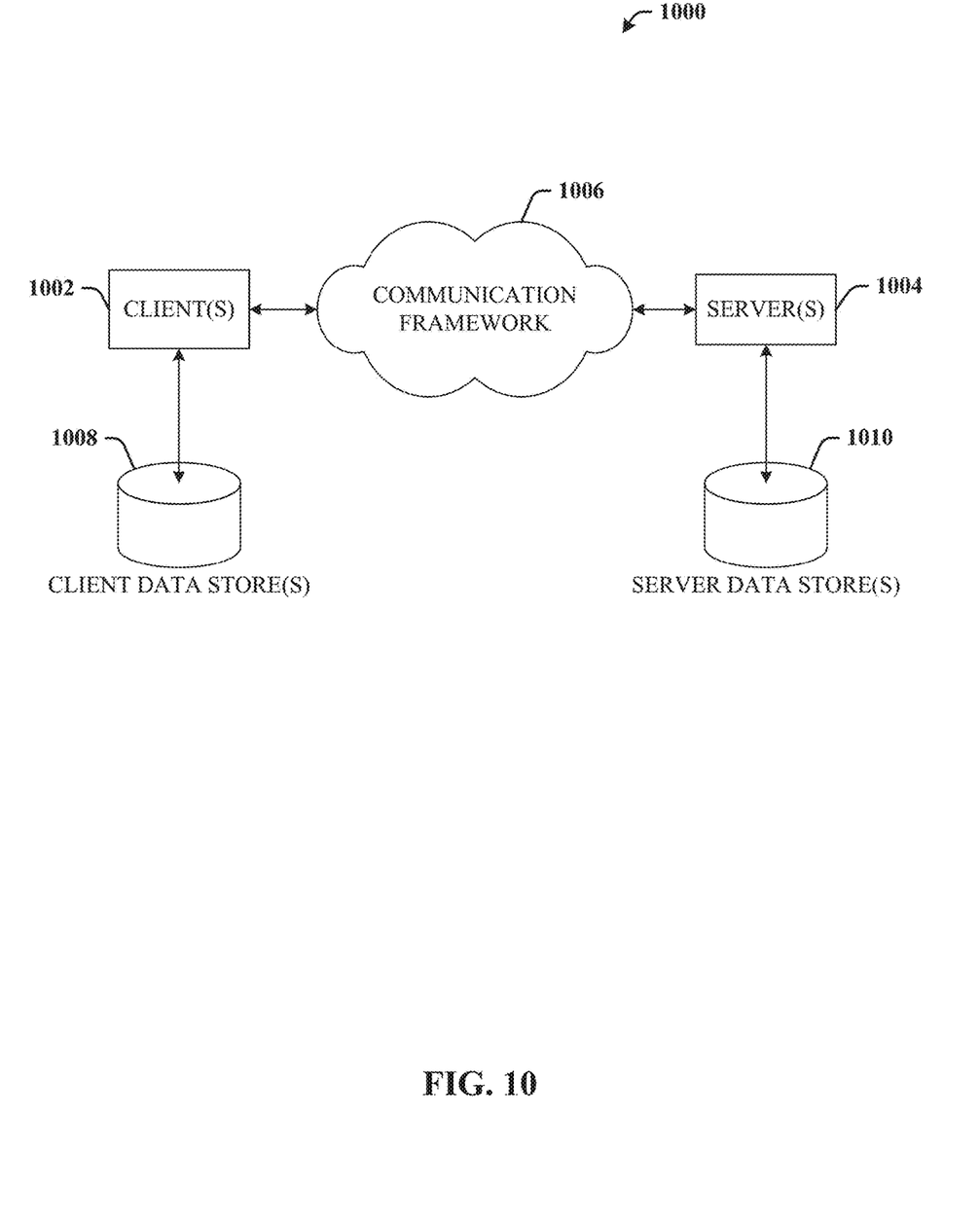
FIG. 10 is an illustration of an example computing environment where one or more of the provisions set forth herein are implemented, according to one or more embodiments.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices).

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002. Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system for making payments with a boarding pass, comprising:
   a memory configured to store computer-executable instructions; and
   a processor, communicatively coupled to the memory, configured to execute the computer-executable instructions to perform operations, the operations comprising:
      receiving a passenger name record number and a payment request from a point of sale device, wherein the passenger name record number is determined in response to the point of sale device scanning the boarding pass;
      identifying a travel itinerary based on the passenger name record number and a first location of the point of sale device and a first time the boarding pass was scanned; and
      authenticating the payment request in response to the first time and the first location of the point of sale device matching a time period and a second location on the travel itinerary, wherein the time period includes at least one of between a first predetermined time before a departure time and the departure time and between an arrival time and a second predetermined time after the arrival time, wherein the departure time and the arrival time are determined based on querying a flight tracking server with flight information included in the travel itinerary, wherein the querying retrieves an updated itinerary including at least one of, in real time or near real time, an updated departure time or an updated arrival time, wherein the updated itinerary changes the time period for authenticating the payment request; and
      preventing, at a payment server, the payment request in response to the first time not matching a time within the time period.

2. The system of claim 1, wherein the operations further comprise:
   initiating payment in response to authenticating the payment request using financial account information associated with the passenger name record number.

3. The system of claim 2, wherein the financial account information comprises a set of financial accounts that are associated with the passenger name record number.

4. The system of claim 3, wherein the payment request includes an automatic selection of a financial account of the set of financial accounts, wherein the automatic selection is based on a current portion of the travel itinerary.

5. The system of claim 1, wherein the operations further comprise:
   receiving authentication information from at least one of a mobile device associated with the boarding pass or the point of sale device; and
   authenticating the payment request in response to the authentication information matching an authentication profile associated with financial account information.

6. The system of claim 5, wherein the operations further comprise:
   selecting a financial account of a set of financial accounts to initiate payment from based on the authentication information.

7. The system of claim 5, wherein the authentication information comprises biometric data determined by the mobile device or the point of sale device.

8. The system of claim 1, wherein the operations further comprise:
   receiving location information corresponding to a third location from a mobile device associated with the boarding pass; and
   authenticating the payment request in response to matching the third location to the second location.

9. A method for making payments with a boarding pass, comprising:
   receiving a passenger name record number and a payment request from a point of sale device, wherein the passenger name record number is determined in response to the point of sale device scanning the boarding pass;
   identifying a travel itinerary based on the passenger name record number and a first location of the point of sale device and a first time the boarding pass was scanned; and
   authenticating the payment request in response to the first time and the first location of the point of sale device matching a time period and a second location on the travel itinerary, wherein the time period includes at least one of between a first predetermined time before a departure time and the departure time and between an arrival time and a second predetermined time after the arrival time, wherein the departure time and the arrival time are determined based on querying a flight tracking server with flight information included in the travel itinerary, wherein the querying retrieves an updated itinerary including at least one of, in real time or near real time, an updated departure time or an updated arrival time, wherein the updated itinerary changes the time period for authenticating the payment request; and
   preventing, at a payment server, the payment request in response to the first time not matching a time within the time period.

10. The method of claim 9, further comprising:
    initiating payment in response to authenticating the payment request using financial account information associated with the passenger name record number.

11. The method of claim 10, wherein the financial account information comprises a set of financial accounts that are associated with the passenger name record number.

12. The method of claim 11, wherein the payment request includes an automatic selection of a financial account of the set of financial accounts, wherein the automatic selection is based on a current portion of the travel itinerary.

13. The method of claim 9, further comprising:
receiving authentication information from at least one of a mobile device associated with the boarding pass or the point of sale device; and
authenticating the payment request in response to the authentication information matching an authentication profile associated with financial account information.

14. The method of claim 13, further comprising:
selecting a financial account of a set of financial accounts to initiate payment from based on the authentication information.

15. The method of claim 13, wherein the authentication information comprises biometric data determined by the mobile device or the point of sale device.

16. The method of claim 9, further comprising:
receiving location information corresponding to a third location from a mobile device associated with the boarding pass; and
authenticating the payment request in response to matching the third location to the second location.

17. A non-transitory computer readable medium comprising instructions to control one or more processors, the instructions comprising:
receive a passenger name record number and a payment request from a point of sale device, wherein the passenger name record number is determined in response to the point of sale device scanning the boarding pass;
identify a travel itinerary based on the passenger name record number and a first location of the point of sale device and a first time the boarding pass was scanned;
authenticate the payment request in response to the first time and the first location of the point of sale device matching a time period and a second location on the travel itinerary, wherein the time period includes at least one of between a first predetermined time before a departure time and the departure time and between an arrival time and a second predetermined time after the arrival time, wherein the departure time and the arrival time are determined based on querying a flight tracking server with flight information included in the travel itinerary, wherein the querying retrieves an updated itinerary including at least one of, in real time or near real time, an updated departure time or an updated arrival time, wherein the updated itinerary changes the time period for authenticating the payment request; and
prevent, at a payment server, the payment request in response to the first time not matching a time within the time period.

\* \* \* \* \*